United States Patent
Kim et al.

(10) Patent No.: US 8,796,404 B2
(45) Date of Patent: Aug. 5, 2014

(54) POLYMER FOR OPTICAL FILM, METHOD OF PREPARING SAME, AND OPTICAL FILM INCLUDING SAME

(75) Inventors: Hyung Jun Kim, Yongin-si (KR); Myung-Sup Jung, Seongnam-si (KR); Won Cheol Jung, Seoul (KR); Jong-Hoon Won, Yongin-si (KR); Kyu Yeol In, Uiwang-si (KR)

(73) Assignees: Samsung Electronics Co., Ltd. (KR); Cheil Industries, Inc. (KR)

( * ) Notice: Subject to any disclaimer, the term of this patent is extended or adjusted under 35 U.S.C. 154(b) by 0 days.

(21) Appl. No.: 13/545,608

(22) Filed: Jul. 10, 2012

(65) Prior Publication Data

US 2013/0165609 A1 Jun. 27, 2013

(30) Foreign Application Priority Data

Dec. 27, 2011 (KR) .................. 10-2011-0143693

(51) Int. Cl.
*C08F 26/06* (2006.01)
*C08F 226/06* (2006.01)
*C08F 232/04* (2006.01)

(52) U.S. Cl.
USPC ........... 526/259; 526/281; 526/282; 526/312; 526/262

(58) Field of Classification Search
USPC .................... 526/259, 262, 281, 282, 312
See application file for complete search history.

(56) References Cited

U.S. PATENT DOCUMENTS 3,494,897 A * 2/1970 Reding et al. .................. 526/281
5,232,560 A 8/1993 Bell et al.
(Continued)

FOREIGN PATENT DOCUMENTS

JP 01311111 A * 12/1989
(Continued)

OTHER PUBLICATIONS

Ihara, E.et al., Radical copolymerization of methyl 2-norbornene-2-carboxylate and 2-phenyl-2-norbornene with styrene, alkyl acrylate, and methyl methacrylate: Facile incorporation of norbornane framework into polymer main chain and its effect on glass transition temperature, Polymer, 2010, vol. 51(2): 397-402.

(Continued)

*Primary Examiner* — Ling Choi
*Assistant Examiner* — David L Miller
(74) *Attorney, Agent, or Firm* — Cantor Colburn LLP

(57) ABSTRACT

A polymer for an optical film including: a repeating unit A including a repeating unit represented by the following Chemical Formula 1; and a repeating unit B derived from a monomer including an unsaturated bond copolymerizable with the repeating unit A:

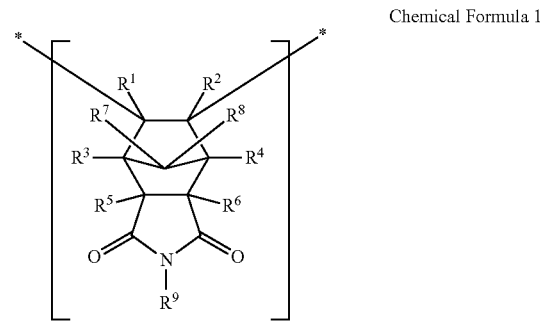

Chemical Formula 1 wherein, in Chemical Formula 1, the variables $R^1$ to $R^9$ are defined herein.

15 Claims, 1 Drawing Sheet

(56) References Cited

U.S. PATENT DOCUMENTS

| | | | |
|---|---|---|---|
| 5,677,405 A | * | 10/1997 | Goodall et al. ............... 526/281 |
| 7,303,858 B2 | * | 12/2007 | Jung et al. ..................... 430/311 |
| 2003/0199638 A1 | | 10/2003 | Liu et al. |

FOREIGN PATENT DOCUMENTS

| | | |
|---|---|---|
| JP | 2004-002752 A | 1/2004 |
| JP | 2004002752 A * | 1/2004 |
| JP | 2006-281731 A | 10/2006 |
| KR | 10-2005-0012724 A | 2/2005 |

OTHER PUBLICATIONS

Liu, B. et al., Palladium(II)-catalyzed addition polymerizations of nadimides with linear alkyl and alicyclic pendant groups, React. Funct. Polym., 2009, vol. 69(8): 606-612.

Yeti, A., Free Radical-Induced Copolymerization of Norbornene and Methacrylate, J. Am. Science, 2008, vol. 4(1): 90-96.

* cited by examiner

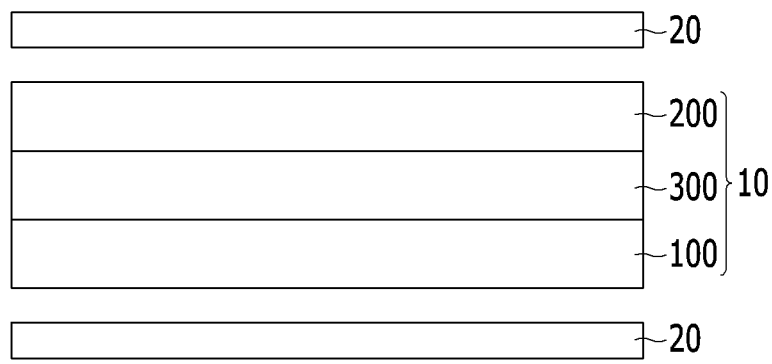

POLYMER FOR OPTICAL FILM, METHOD OF PREPARING SAME, AND OPTICAL FILM INCLUDING SAME

CROSS-REFERENCE TO RELATED APPLICATION

This application claims priority to Korean Patent Application No. 10-2011-0143693, filed on Dec. 27, 2011, and all the benefits accruing therefrom under 35 U.S.C. §119, the entire content of which is incorporated herein by reference.

BACKGROUND

1. Field

This disclosure relates to a polymer for an optical film, a method of preparing the same, an optical film including the same, and a display device including the optical film.

2. Description of the Related Art

A reverse wavelength dispersion phase-difference compensation film has been used to compensate a phase difference and improve wide viewing angle and a color shift in a display device such as a liquid crystal display ("LCD"), an organic light emitting diode ("OLED") device, and the like. However, a display device such as a liquid crystal display, an organic light emitting diode device, and the like is fabricated using a method including a high temperature process. Accordingly, development of a material having excellent heat resistance for use in an optical film, including a reverse wavelength dispersion phase-difference compensation film, is desired.

SUMMARY

An embodiment provides a polymer for an optical film having excellent or improved negative birefringence, heat resistance, and moisture resistance.

Another embodiment provides a method of preparing the polymer for an optical film.

Another embodiment provides an optical film including the polymer for an optical film.

Another embodiment provides a display device including the optical film.

According to an embodiment, provided is a polymer for an optical film that includes a repeating unit A including a repeating unit represented by the following Chemical Formula 1, and a repeating unit B derived from a monomer including an unsaturated bond copolymerizable with the repeating unit A.

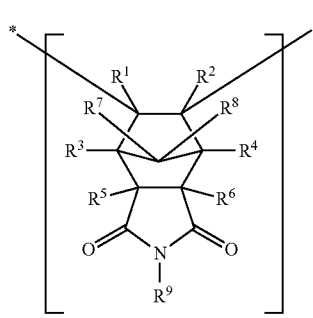

Chemical Formula 1

In Chemical Formula 1,
$R^1$ to $R^8$ are the same or different in each repeating unit and are each independently hydrogen, or a substituted or unsubstituted C1 to C10 aliphatic group, and $R^9$ is the same or different in each repeating unit and each is independently hydrogen, a substituted or unsubstituted C1 to C30 aliphatic group, a substituted or unsubstituted C3 to C30 alicyclic group, a substituted or unsubstituted C6 to C30 aromatic group, or a substituted or unsubstituted C2 to C30 heterocyclic group, wherein the aromatic group is present singularly; at least two aromatic groups are linked to provide a condensed cyclic group; or at least two aromatic groups are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, and —C(=O)NH—.

In an embodiment, the repeating unit represented by the Chemical Formula 1 may include a repeating unit represented by the following Chemical Formulas 11-1 to 11-3, or a combination thereof.

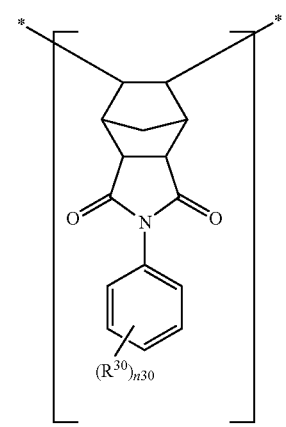

Chemical Formula 11-1

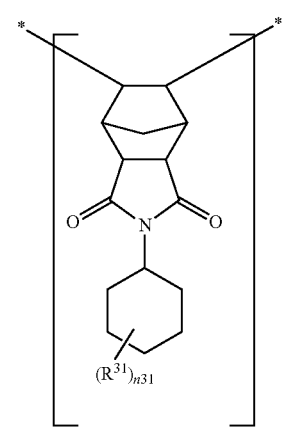

Chemical Formula 11-2

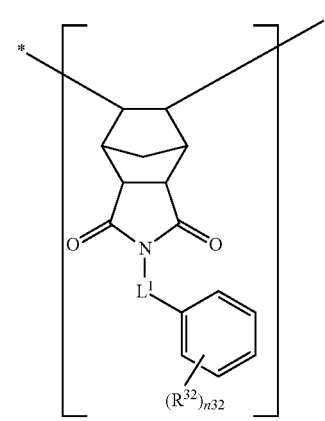

Chemical Formula 11-3

In Chemical Formulas 11-1 to 11-3, $R^{30}$ to $R^{32}$ are the same or different in each repeating unit and are each independently hydrogen, or a C1 to C20 alkyl group, $L^1$ is the same or different in each repeating unit and each is independently a substituted or unsubstituted C1 to C5 linear or branched alkylene group, —C(=O)NH—, —NHC(=O)—, —C(=O)O—, or —OC(=O)—, n30 and n32 are the same or different in each repeating unit and are each independently an integer ranging from 0 to 5, and n31 is the same or different in each repeating unit and each is independently an integer ranging from 0 to 11.

In another embodiment, the repeating unit represented by the Chemical Formula 1 may include a repeating unit represented by the following Chemical Formulas 21-1 to 21-3, or a combination thereof.

Chemical Formula 21-1

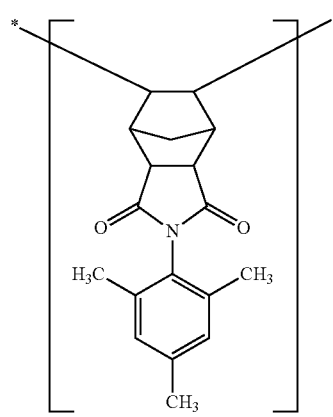

Chemical Formula 21-2

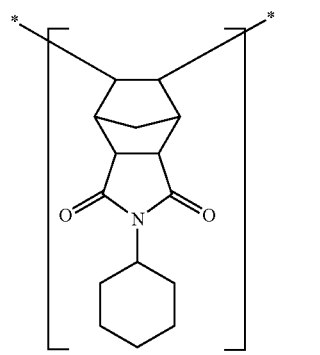

Chemical Formula 21-3

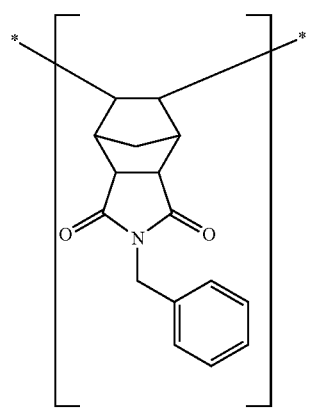

The repeating unit B may include a repeating unit represented by the following Chemical Formula 2, a repeating unit represented by the following Chemical Formula 3, or a combination thereof.

Chemical Formula 2

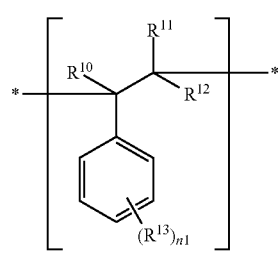

In Chemical Formula 2, $R^{10}$ to $R^{12}$ are the same or different in each repeating unit and are each independently hydrogen, or a substituted or unsubstituted C1 to C10 aliphatic group, $R^{13}$ is the same or different in each repeating unit and each is independently hydrogen, a halogen, a substituted or unsubstituted C1 to C30 aliphatic group, a substituted or unsubstituted C3 to C30 alicyclic group, a substituted or unsubstituted C6 to C30 aromatic group, a substituted or unsubstituted C2 to C30 heterocyclic group, a substituted or unsubstituted C1 to C30 alkoxy group, a substituted or unsubstituted C6 to C30 aryloxy group, a substituted or unsubstituted C2 to C30 ester group, a carboxyl group, or —N($R^{100}$)($R^{101}$), (wherein $R^{100}$ and $R^{101}$ are the same or different and are each independently hydrogen, or a substituted or unsubstituted C1 to C10 aliphatic group), wherein the aromatic group is present singularly; at least two aromatic groups are linked to provide a condensed cyclic group; or at least two aromatic groups are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, and n1 is the same or different in each repeating unit and each is independently an integer ranging from 0 to 5.

Chemical Formula 3

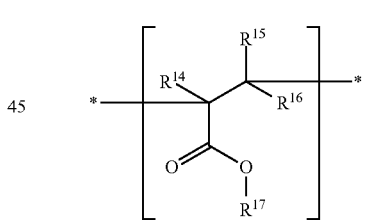

In Chemical Formula 3, $R^{14}$ is the same or different in each repeating unit and each is independently hydrogen, or a methyl group, $R^{15}$ and $R^{16}$ are the same or different in each repeating unit and are each independently hydrogen, or a substituted or unsubstituted C1 to C10 aliphatic group, and $R^{17}$ is the same or different in each repeating unit and each is independently a substituted or unsubstituted C1 to C30 aliphatic group, a substituted or unsubstituted C3 to C30 alicyclic group, a substituted or unsubstituted C6 to C30 aromatic group, or a substituted or unsubstituted C2 to C30 heterocyclic group, wherein the aromatic group is present singularly; at least two aromatic groups are linked to provide a condensed cyclic group; or at least two aromatic groups are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In an embodiment, the repeating unit represented by the Chemical Formula 2 may include a repeating unit represented by the following Chemical Formula 22-1, and the repeating unit represented by the Chemical Formula 3 may include a repeating unit represented by the following Chemical Formula 23-1, a repeating unit represented by the following Chemical Formula 23-2, or a combination thereof.

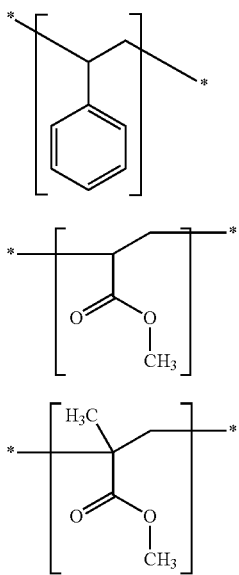

Chemical Formula 22-1

Chemical Formula 23-1

Chemical Formula 23-2

The polymer for an optical film may include the repeating unit A and the repeating unit B in a mole ratio of about 0.1:99.9 to about 50:50.

The polymer for an optical film may have a number average molecular weight (Mn) of about 10,000 grams per mole (g/mol) to about 200,000 g/mol.

According to an embodiment, the polymer for an optical film may have a polydispersity index of about 1.0 to about 5.0.

The polymer for an optical film may have a refractive index of about 1.40 to about 1.69.

The polymer for an optical film may have a glass transition temperature ($T_g$) of about 80° C. to about 200° C.

According to another embodiment, provided is a method of preparing a polymer for an optical film, the method including: combining a monomer represented by the following Chemical Formula 1-1, a monomer including an unsaturated bond copolymerizable with the monomer represented by the Chemical Formula 1-1, and a free radical initiator to form a mixture, and polymerizing the mixture to provide the polymer for an optical film.

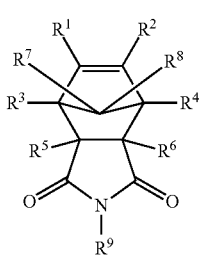

Chemical Formula 1-1

In Chemical Formula 1-1,
$R^1$ to $R^9$ are the same as defined in Chemical Formula 1.

The monomer including an unsaturated bond copolymerizable with the monomer represented by the Chemical Formula 1-1 may include a monomer represented by the following Chemical Formula 2-1, a monomer represented by the following Chemical Formula 3-1, or a combination thereof.

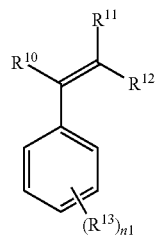

Chemical Formula 2-1

In Chemical Formula 2-1,
$R^{10}$ to $R^{13}$ and n1 are the same as defined in Chemical Formula 2.

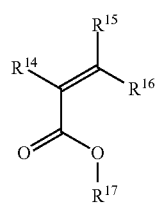

Chemical Formula 3-1

In Chemical Formula 3-1,
$R^{14}$, $R^{15}$, $R^{16}$, and $R^{17}$ are the same as defined in the above Chemical Formula 3.

According to yet another embodiment, an optical film including the polymer for an optical film is provided.

The optical film may have an in-plane phase-difference value ($R_e$) ranging from about 0 nanometers (nm) to about 500 nm at a wavelength of about 550 nm.

According to an embodiment, the optical film may have a thickness direction phase-difference value ($R_{th}$) ranging from about 0 nm to about −1000 nm at a wavelength of about 550 nm.

The optical film may have a short wavelength dispersion of the in-plane phase-difference value ($R_e$) (450 nm/550 nm) ranging from about 0.81 to about 1.20 and a long wavelength dispersion of the in-plane phase-difference value ($R_e$) (650 nm/550 nm) ranging from about 0.90 to about 1.18.

The optical film may have a total light transmittance of greater than or equal to about 80% at a wavelength range of about 380 nm to about 780 nm.

According to an embodiment, the optical film may have a haze of less than or equal to about 3%.

The optical film may have a glass transition temperature of about 80° C. to about 200° C.

According to still another embodiment, a display device including the optical film is provided.

BRIEF DESCRIPTION OF THE DRAWING

The above and other aspects, advantages and features of this disclosure will become more apparent by describing in further detail embodiments thereof with reference to the accompanying drawings.

FIG. 1 is a cross-sectional view showing a liquid crystal display ("LCD") according to an embodiment as disclosed herein.

DETAILED DESCRIPTION

This disclosure will be described more fully hereinafter with reference to the accompanying drawings, in which various embodiments are shown. This disclosure may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

In the drawings, the thickness of layers, films, panels, regions, etc., are not to scale for clarity.

It will be understood that when an element such as a layer, film, region, or substrate is referred to as being "on" or "disposed on" another element, it can be directly on the other element or intervening elements may also be present. In contrast, when an element is referred to as being "directly on" or "directly disposed on" another element, there are no intervening elements present.

The terminology used herein is for the purpose of describing particular embodiments only and is not intended to be limiting. As used herein, the singular forms "a," "an," and "the" are intended to include the plural forms as well, including "at least one," unless the content clearly indicates otherwise. "Or" means "and/or." It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning consistent with their meaning in the context of the relevant art and the present disclosure, and will not be interpreted in an idealized or overly formal sense unless expressly so defined herein.

As used herein, when a specific definition is not otherwise provided, the term "substituted" refers to a compound or group substituted with a substituent including a halogen (specifically the halogens —F, —Cl, —Br, or —I), a hydroxyl group, a nitro group, a cyano group, an amino group (—$NH_2$, —$NH(R^{200})$ or —$N(R^{201})(R^{202})$, wherein $R^{200}$, $R^{201}$, and $R^{202}$ are the same or different, and are each independently a C1 to C10 alkyl group), an amidino group, a hydrazino group, a hydrazono group, a carboxyl group, an ester group, a ketone group, a substituted or unsubstituted C1 to C30 alkyl group, a substituted or unsubstituted C3 to C30 alicyclic group, a substituted or unsubstituted C6 to C30 aryl group, a substituted or unsubstituted C2 to C30 alkenyl group, a substituted or unsubstituted C2 to C30 alkynyl group, a substituted or unsubstituted C5 to C30 heteroaryl group, and a substituted or unsubstituted C2 to C30 heterocyclic group, instead of hydrogen of a functional group, or two or more of the forgoing substituents are linked to one another to provide a ring, provided that the substituted atom's normal valence is not exceeded.

As used herein, when a specific definition is not otherwise provided, the term "alkyl" group refers to a straight or branched chain saturated aliphatic hydrocarbon having the specified number of carbon atoms, for example a C1 to C30 alkyl group, and specifically a C1 to C15 alkyl group, and having a valence of at least one, optionally substituted with one or more substituents where indicated, provided that the valence of the alkyl group is not exceeded.

The term "cycloalkyl" group refers to a group that comprises one or more saturated and/or partially saturated rings in which all ring members are carbon, such as cyclopropyl, cyclobutyl, cyclopentyl, cyclohexyl, cycloheptyl, cyclooctyl, adamantyl and partially saturated variants of the foregoing, such as cycloalkenyl groups (e.g., cyclohexenyl) or cycloalkynyl groups, and having a valence of at least one, and optionally substituted with one or more substituents where indicated, provided that the valence of the alkyl group is not exceeded. Cycloalkyl groups do not include an aromatic ring or a heterocyclic ring. When the numbers of carbon atoms is specified, for example a C3 to C30 cycloalkyl group, and specifically a C3 to C18 cycloalkyl group, the number means the number of ring members present in the one or more rings.

The term "cycloalkenyl" group refers to a stable monovalent aliphatic monocyclic or polycyclic group having at least one carbon-carbon double bond, wherein all ring members are carbon. Non-limiting examples include cyclopentenyl and cyclohexenyl.

The term "cycloalkynyl" group refers to a stable aliphatic monocyclic or polycyclic group having at least one carbon-carbon triple bond, wherein all ring members are carbon. Non-limiting examples include cyclohexynyl.

The term "cycloalkylene" group refers to a divalent radical formed by the removal of two hydrogen atoms from one or more rings of a cycloalkyl group, as defined above.

The term "cycloalkenylene" group refers to a stable aliphatic 5-15-membered monocyclic or polycyclic, divalent radical having at least one carbon-carbon double bond, which comprises one or more rings connected or bridged together. Unless mentioned otherwise, the cycloalkenylene radical can be linked at any desired carbon atom provided that a stable structure is obtained. If the cycloalkenylene radical is substituted, this may be so at any desired carbon atom, once again provided that a stable structure is obtained. Non-limiting examples thereof include cyclopentenylene, cyclohexenylene, cycloheptenylene, cyclooctenylene, cyclononenylene, cyclodecenylene, norbornenylene, 2-methylcyclopentenylene, 2-methylcyclooctenylene, and the like.

The term "cycloalkynylene" group refers to a stable aliphatic 8- to 15-membered monocyclic or polycyclic divalent radical having at least one carbon-carbon triple bond and consisting solely of carbon and hydrogen atoms which may comprise one or more fused or bridged ring(s), preferably a 8- to 10-membered monocyclic or 12- to 15-membered bicyclic ring. Unless otherwise specified, the cycloalkynylene ring may be attached at any carbon atom which results in a stable structure and, if substituted, may be substituted at any suitable carbon atom which results in a stable structure. Non-limiting examples include cyclooctynylene, cyclononynylene, cyclodecynylene, 2-methylcyclooctynylene, and the like.

The term "alkoxy" group refers to an alkyl group as defined above, having the specified number of carbon atoms, for example a C1 to C30 alkoxy group, and specifically a C1 to C18 alkoxy group, linked via an oxygen, e.g. alkyl-O—.

The term "ester" group refers to a —C(=O)OR group, wherein R is an aliphatic group as defined below, having the specified number of carbon atoms, for example a C2 to C30 ester group, and specifically a C2 to C18 ester group, wherein the carbon of the carbonyl group is included in the specified number of carbon atoms.

The term "ketone group" refers to a —C(=O)R group, wherein R is an aliphatic group as defined below, having the specified number of carbon atoms, for example a C2 to C30 ketone group, and specifically a C2 to C18 ketone group, wherein the carbon of the carbonyl group is included in the specified number of carbon atoms.

The term "aryl" group refers to a cyclic group in which all ring members are carbon and at least one ring is aromatic, the group having the specified number of carbon atoms, for example a C6 to C30 aryl group, and specifically a C6 to C18 aryl group, and having a valence of at least one, optionally substituted with one or more substituents where indicated, provided that the valence of the aryl group is not exceeded. More than one ring may be present, and any additional rings may be independently aromatic, saturated or partially unsaturated, and may be fused, pendant, spirocyclic, or a combination thereof.

The term "aryloxy" group refers to an aryl group as defined above, having the specified number of carbon atoms, for example a C6 to C30 aryloxy group, and specifically a C6 to C18 aryloxy group, linked via an oxygen, e.g. aryl-O—.

The term "alkenyl" group refers to a straight or branched chain hydrocarbon that comprises at least one carbon-carbon double bond, having the specified number of carbon atoms, for example a C2 to C30 alkenyl group, and specifically a C2 to C18 alkenyl group, and having a valence of at least one, optionally substituted with one or more substituents where indicated, provided that the valence of the alkenyl group is not exceeded.

The term "alkynyl" group refers to a straight or branched chain, monovalent hydrocarbon group having at least one carbon-carbon triple bond. Non-limiting examples include ethynyl.

The term "alkylene" group refers to a straight or branched chain, saturated, aliphatic hydrocarbon group having the specified number of carbon atoms, for example a C1 to C30 alkylene group, and specifically a C1 to C18 alkylene group, and having a valence of at least two, optionally substituted with one or more substituents where indicated, provided that the valence of the alkyl group is not exceeded.

The term "alkeneylene" group refers to a straight or branched chain hydrocarbon group having at least one carbon-carbon double bond and having a valence of at least two, optionally substituted with one or more substituents where indicated, provided that the valence of the alkyl group is not exceeded.

The term "alkynylene" group refers to a straight or branched chain divalent aliphatic hydrocarbon that has one or more unsaturated carbon-carbon bonds, at least one of which is a triple bond. Non-limiting examples include ethynylene.

The term "arylene group" refers to a divalent radical formed by the removal of two hydrogen atoms from one or more rings of an aromatic hydrocarbon, wherein the hydrogen atoms may be removed from the same or different rings, each of which rings may be aromatic or nonaromatic, and having the specified number of carbon atoms, for example a C6 to C30 arylene group, and specifically a C6 to C16 arylene group.

As used herein, when a specific definition is not otherwise provided, the term "aliphatic group" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, and specifically a C1 to C15 alkyl group, a C2 to C15 alkenyl group, a C2 to C15 alkynyl group, a C1 to C15 alkylene group, a C2 to C15 alkenylene group, or a C2 to C15 alkynylene group.

The term "alicyclic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, and specifically a C3 to C15 cycloalkyl group, a C3 to C15 cycloalkenyl group, a C3 to C15 cycloalkynyl group, a C3 to C15 cycloalkylene group, or a C3 to C15 cycloalkynylene group, The term "aromatic group" refers to a C6 to C30 aryl group or a C6 to C30 arylene group, and specifically a C6 to C16 aryl group or a C6 to C16 arylene group.

The term "heterocyclic group" refers to a C2 to C30 heterocycloalkyl group, a C2 to C30 heterocycloalkylene group, a C2 to C30 heterocycloalkenyl group, a C2 to C30 heterocycloalkenylene group, a C2 to C30 heterocycloalkynyl group, a C2 to C30 heterocycloalkynylene group, a C2 to C30 heteroaryl group, or a C2 to C30 heteroarylene group that includes 1 to 3 heteroatoms selected from O, S, N, P, Si, and a combination thereof in one ring, and specifically a C2 to C15 heterocycloalkyl group, a C2 to C15 heterocycloalkylene group, a C2 to C15 heterocycloalkenyl group, a C2 to C15 heterocycloalkenylene group, a C2 to C15 heterocycloalkynyl group, a C2 to C15 heterocycloalkynylene group, a C2 to C15 heteroaryl group, or a C2 to C15 heteroarylene group, wherein the foregoing heterocyclic groups each includes 1 to 3 heteroatoms selected from O, S, N, P, Si, and a combination thereof in one ring. Other heteroatoms may also be present.

The term "condensed cyclic group" refers groups having two or more rings, wherein at least two of the rings are fused, i.e., share at least two carbon atoms.

As used herein, when a definition is not otherwise provided, the term "combining" is inclusive of mixing and copolymerizing, and the term "combination" includes a mixture, a copolymer, a stacked structure, a composite, an alloy, a blend, a reaction product, or the like.

The term "combination thereof" refers to a combination comprising at least one of the named constituents, components, compounds, or elements, optionally together with one or more of the same class of constituents, components, compounds, or elements not named.

The term "copolymerization" includes random copolymerization, block copolymerization, or graft copolymerization, and the like, and the terms "polymer" and "copolymer" include a random copolymer, block copolymer, or graft copolymer, and the like.

In addition, in the specification, the mark "*" refers to a point of attachment to a repeating unit.

The term "(meth)acrylate" refers to an acrylate group ($H_2C=CH-C(=O)O-$) and a methacrylate group ($H_2C=C(CH_3)-C(=O)-$), and (meth)acryloxy refers to an acryloxy group and a methacryloxy group.

According to an embodiment, provided is a polymer for an optical film including a repeating unit A including a repeating unit represented by the following Chemical Formula 1; and a repeating unit B derived from a monomer including an unsaturated bond copolymerizable with the repeating unit A. In an embodiment, the polymer for an optical film may be a random copolymer, but is not limited thereto.

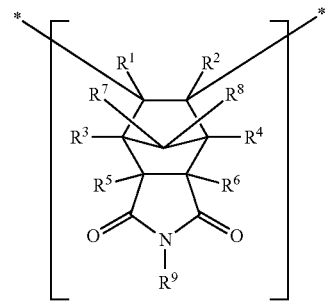

Chemical Formula 1

In Chemical Formula 1, $R^1$ to $R^8$ are the same or different in each repeating unit and are each independently hydrogen, or a substituted or unsubstituted C1 to C10 aliphatic group, and in an embodiment, $R^1$ to $R^8$ are each independently hydrogen, or a substituted or unsubstituted C1 to C5 aliphatic group, and in another embodiment, $R^1$ to $R^8$ are each hydrogen.

$R^9$ in Chemical Formula 1 is the same or different in each repeating unit and each is independently hydrogen, a substituted or unsubstituted C1 to C30 aliphatic group, a substituted or unsubstituted C3 to C30 alicyclic group, a substituted or unsubstituted C6 to C30 aromatic group, or a substituted or unsubstituted C2 to C30 heterocyclic group, wherein the aromatic group is present singularly; at least two aromatic groups are linked to provide a condensed cyclic group; or at least two aromatic groups are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In an embodiment, the $R^9$ in Chemical Formula 1 is the same or different in each repeating unit and each is independently a substituted or unsubstituted C1 to C20 aliphatic group, a substituted or unsubstituted C3 to C20 alicyclic group, a substituted or unsubstituted C6 to C20 aromatic group, or a substituted or unsubstituted C2 to C20 heterocyclic group, and in another embodiment, the $R^9$ in Chemical Formula 1 is the same or different in each repeating unit and each is independently a substituted or unsubstituted C1 to C10 alkyl group, a substituted or unsubstituted C3 to C10 cycloalkyl group, a substituted or unsubstituted C6 to C15 aromatic group, or a substituted or unsubstituted C2 to C15 heterocyclic group.

In an embodiment, the repeating unit represented by the Chemical Formula 1 may include a repeating unit represented by the following Chemical Formulas 11-1 to 11-3, or a combination thereof, but is not limited thereto.

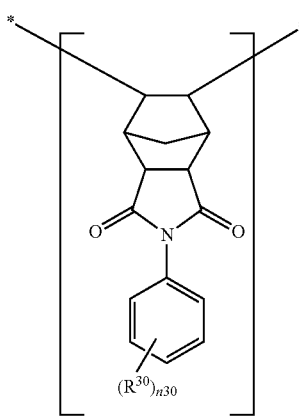

Chemical Formula 11-1

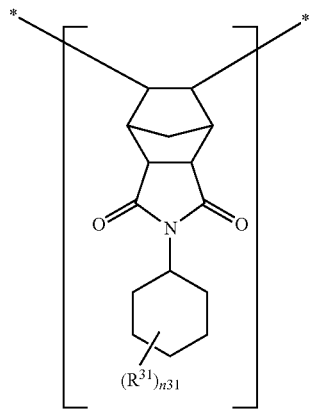

Chemical Formula 11-2

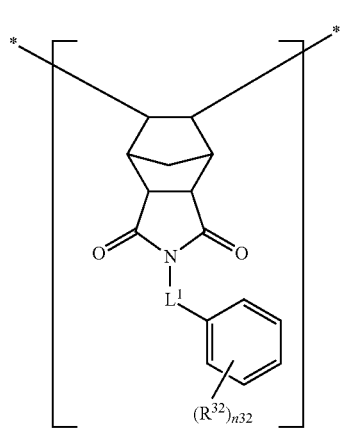

Chemical Formula 11-3

In Chemical Formulas 11-1 to 11-3, $R^{30}$ to $R^{32}$ are the same or different in each repeating unit and each is independently hydrogen or a C1 to C20 alkyl group, and in an embodiment, $R^{30}$ to $R^{32}$ are each independently hydrogen or a C1 to C10 alkyl group, $L^1$ is the same or different in each repeating unit and each is independently a substituted or unsubstituted C1 to C5 linear or branched alkylene group, —C(=O)NH—, —NHC(=O)—, —C(=O)O—, or —OC(=O)—, and according to an embodiment, $L^1$ is a substituted or unsubstituted C1 to C3 linear or branched alkylene group, —C(=O)NH—, —NHC(=O)—, —C(=O)O—, or —OC(=O)—, and in another embodiment, $L^1$ is a methylene group, an ethylene group, —C(=O)NH—, —NHC(=O)—, —C(=O)O—, or —OC(=O)—, n30 and n32 are the same or different in each repeating unit and are each independently an integer ranging from 0 to 5, and n31 is the same or different in each repeating unit and each is independently an integer ranging from 0 to 11.

In another embodiment, the repeating unit represented by the Chemical Formula 1 may include a repeating unit represented by the following Chemical Formulas 21-1 to 21-3, or a combination thereof, but is not limited thereto.

Chemical Formula 21-1

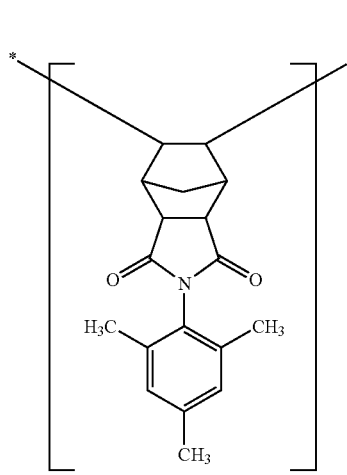

Chemical Formula 21-2

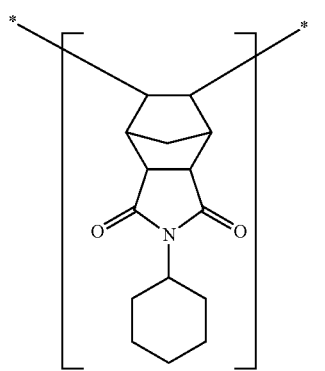

Chemical Formula 21-3

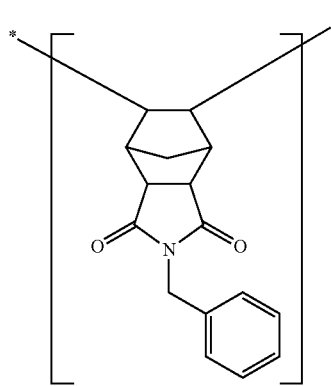

The repeating unit A including the above repeating unit represented by Chemical Formula 1 may be derived from a substituted or unsubstituted nadimide monomer or a derivative thereof, and thus a polymer for an optical film including the repeating unit A may improve heat resistance and moisture resistance of the optical film.

The repeating unit B is derived from a monomer comprising an unsaturated bond copolymerizable with the repeating unit A. In an embodiment, the monomer may further contain a substituted or unsubstituted C6-C30 aromatic group or a substituted or unsubstituted C2-C30 ester group. For example, the repeating unit B may include a repeating unit represented by the following Chemical Formula 2 a repeating unit represented by the following Chemical Formula 3, or a combination thereof, but is not limited thereto.

Chemical Formula 2

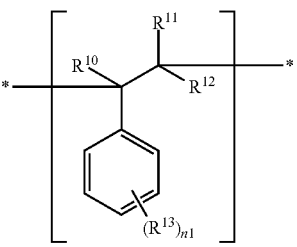

In Chemical Formula 2, $R^{10}$ to $R^{12}$ are the same or different in each repeating unit and are each independently hydrogen, or a substituted or unsubstituted C1 to C10 aliphatic group, and according to an embodiment, $R^{10}$ to $R^{12}$ are each independently hydrogen, or a substituted or unsubstituted C1 to C5 aliphatic group, and in another embodiment, $R^{10}$ to $R^{12}$ are each hydrogen;

$R^{13}$ is the same or different in each repeating unit and each is independently hydrogen, a halogen, a substituted or unsubstituted C1 to C30 aliphatic group, a substituted or unsubstituted C3 to C30 alicyclic group, a substituted or unsubstituted C6 to C30 aromatic group, a substituted or unsubstituted C2 to C30 heterocyclic group, a substituted or unsubstituted C1 to C30 alkoxy group, a substituted or unsubstituted C6 to C30 aryloxy group, a substituted or unsubstituted C2 to C30 ester group, a carboxyl group, or —N($R^{100}$)($R^{101}$), (wherein $R^{100}$ and $R^{101}$ are the same or different and are each independently hydrogen, or a substituted or unsubstituted C1 to C10 aliphatic group), wherein the aromatic group is present singularly; at least two aromatic groups are linked to provide a condensed cyclic group; or at least two aromatic groups are linked via a single bond, —O—, —S—, —C(=O)—, —CH(OH)—, —S(=O)$_2$—, —Si(CH$_3$)$_2$—, —(CH$_2$)$_p$— (wherein $1 \leq p \leq 10$), —(CF$_2$)$_q$— (wherein $1 \leq q \leq 10$), —C(CH$_3$)$_2$—, —C(CF$_3$)$_2$—, or —C(=O)NH—. In an embodiment, $R^{13}$ is the same or different in each repeating unit and each is independently hydrogen, a halogen, a substituted or unsubstituted C1 to C20 aliphatic group, a substituted or unsubstituted C3 to C20 alicyclic group, a substituted or unsubstituted C6 to C20 aromatic group, a substituted or unsubstituted C2 to C20 heterocyclic group, a substituted or unsubstituted C1 to C20 alkoxy group, a substituted or unsubstituted C6 to C20 an aryloxy group, a substituted or unsubstituted C2 to C20 ester group, a carboxyl group, or —N($R^{100}$)($R^{101}$), (wherein $R^{100}$ and $R^{101}$ are the same or different and are each independently hydrogen, or a substituted or unsubstituted C1 to C10 aliphatic group), and in another embodiment, $R^{13}$ is the same or different in each repeating unit and each is independently hydrogen, a halogen, a substituted or unsubstituted C1 to C10 alkyl group, a substituted or unsubstituted C3 to C10 cycloalkyl group, a substituted or unsubstituted C6 to C15 aromatic group, a substituted or unsubstituted C2 to C15 heterocyclic group, a substituted or unsubstituted C1 to C10 alkoxy group, a substituted or unsubstituted C6 to C15 an aryloxy group, a substituted or unsubstituted C2 to C10 ester group, a carboxyl group, or —N($R^{100}$)($R^{101}$) (wherein $R^{100}$ and $R^{101}$ are the same or different and are each independently hydrogen, or a substituted or unsubstituted C1 to C10 aliphatic group); and n1 is the same or different in each repeating unit and each is independently an integer ranging from 0 to 5.

Chemical Formula 3

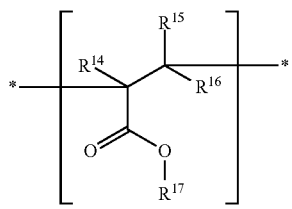

In Chemical Formula 3, $R^{14}$ is the same or different in each repeating unit, and each is independently hydrogen or a methyl group;

$R^{15}$ and $R^{16}$ are the same or different in each repeating unit and are each independently hydrogen, or a substituted or unsubstituted C1 to C10 aliphatic group, and in an embodiment, $R^{15}$ and $R^{16}$ are each independently hydrogen, or a substituted or unsubstituted C1 to C5 aliphatic group, and in another embodiment, $R^{15}$ and $R^{16}$ are each hydrogen; and $R^{17}$ is the same or different in each repeating unit and each is independently a substituted or unsubstituted C1 to C30 aliphatic group, a substituted or unsubstituted C3 to C30 alicyclic group, a substituted or unsubstituted C6 to C30 aromatic group, or a substituted or unsubstituted C2 to C30 heterocyclic group, wherein the aromatic group is present singularly; at least two aromatic groups are linked to provide a condensed cyclic group; or at least two aromatic groups are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH. In an embodiment, $R^{17}$ is the same or different in each repeating unit and each is independently a substituted or unsubstituted C1 to C20 aliphatic group, a substituted or unsubstituted C3 to C20 alicyclic group, a substituted or unsubstituted C6 to C20 aromatic group, or a substituted or unsubstituted C2 to C20 heterocyclic group, and in another embodiment, $R^{17}$ is the same or different in each repeating unit and each is independently a substituted or unsubstituted C1 to C10 alkyl group, a substituted or unsubstituted C3 to C10 cycloalkyl group, a substituted or unsubstituted C6 to C15 aromatic group, or a substituted or unsubstituted C2 to C15 heterocyclic group.

In an embodiment, the repeating unit represented by the Chemical Formula 2 may include a repeating unit represented by the following Chemical Formula 22-1, and the repeating unit represented by the Chemical Formula 3 may include a repeating unit represented by the following Chemical Formula 23-1, a repeating unit represented by the following Chemical Formula 23-2, or a combination thereof, but is not limited thereto.

Chemical Formula 22-1

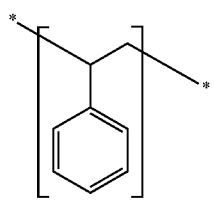

Chemical Formula 23-1

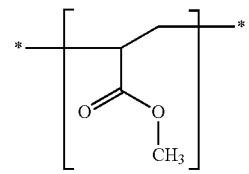

Chemical Formula 23-2

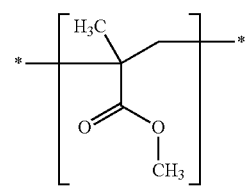

Since the repeating unit B, i.e., the repeating unit represented by Chemical Formula 2, the repeating unit represented by Chemical Formula 3, and a combination thereof has negative birefringence and excellent moisture resistance, while not wishing to be bound by theory, it is believed a polymer for an optical film including the same may have improved negative birefringence and moisture resistance. In addition, since polymerization of a monomer for deriving the repeating unit B may be easily initiated by a free radical initiator, the polymer for an optical film may be prepared without the use of a metal catalyst, and thus may have excellent or improved processibility and economic feasibility.

The polymer for an optical film including the repeating units A and B may not only maintain excellent negative birefringence but may also have excellent or improved heat resistance and moisture resistance. Accordingly, while not wishing to be bound by theory, it is believed an optical film including the polymer for an optical film may have excellent or improved negative birefringence, heat resistance, and moisture resistance.

Other types of the repeating units B may be used instead of or in addition to the repeating unit represented by Chemical Formula 2, the repeating unit represented by Chemical Formula 3, and a combination thereof, provided that the other units may be derived from a monomer comprising an unsaturated bond copolymerizable with the repeating unit A, and the desired properties of the polymer for an optical film are not significantly adversely affected, for example heat resistance, moisture resistance, and negative birefringence, and provided that the polymer can be processed to form an optical film and is suitable for use in an intended device, for example a display device. Other types of monomers comprising an unsaturated bond copolymerizable with the repeating unit A include a substituted or unsubstituted vinyl ester monomer, a substituted or unsubstituted vinyl ether monomer, a substituted or unsubstituted allyl ether monomer, a substituted or unsubstituted allyl ester monomer, a substituted or unsubstituted (meth)acrylate ester monomer, a substituted or unsubstituted maleimide monomer, a substituted or unsubstituted itaconimide monomer, and the like. Such monomers may include other polymer repeating units, (e.g., amide units, carbonate units, ester units, ether units, imide units, siloxane units, silane units, and the like, as well as combinations thereof), for example a urethane di(meth)acrylate. In an embodiment, no repeating units other than the repeating unit represented by Chemical Formula 1 and the repeating units represented by Chemical Formula 2, Chemical Formula 3, and a combination thereof is present in the polymer for an optical film.

The polymer for an optical film may include the repeating unit A and the repeating unit B in a mole ratio of about 0.1:99.9 to about 50:50. When the polymer for an optical film includes the repeating units A and B within the foregoing range, negative birefringence, heat resistance, and moisture resistance of the polymer for an optical film may be effectively improved. In an embodiment, the polymer for an optical film may include the repeating unit A and the repeating unit B in a mole ratio of about 1:99 to about 30:70, and more specifically about 1:99 to about 40:60. If repeating units other than the repeating unit B are present, such units are present in an amount ranging from about 0.1 to about 10 mole percent, or about 0.1 to about 5 mole percent, based on the total moles of units in the polymer for an optical film.

The polymer for an optical film may have a number average molecular weight ("Mn") of about 10,000 grams per mole (g/mol) to about 200,000 g/mol. When the polymer for an optical film has a number average molecular weight within the foregoing range, the polymer for an optical film may have a melting viscosity effective to facilitate the formation of a film. In an embodiment, the polymer for an optical film may have a number average molecular weight ("Mn") of about 50,000 g/mol to about 100,000 g/mol, and more specifically about 50,000 g/mol to about 80,000 g/mol.

The polymer for an optical film may have a weight average molecular weight ("Mw") of about 30,000 g/mol to about 500,000 g/mol. When the polymer for an optical film has a weight average molecular weight within the foregoing range, the polymer for an optical film may have a melting viscosity effective to facilitate the formation of a film. In an embodiment, the polymer for an optical film may have a weight average molecular weight of about 100,000 g/mol to about 300,000 g/mol, and more specifically about 150,000 g/mol to about 250,000 g/mol.

The polymer for an optical film may have a polydispersity index ("PDI") of about 1.0 to about 5.0. When the polymer for an optical film has a polydispersity index within the foregoing range, the polymer for an optical film may have excellent or improved quality, reproducibility, and uniformity of the film. In an embodiment, the polymer for an optical film may have a polydispersity index of about 1.2 to about 2.5, and more specifically about 1.2 to about 2.0.

The polymer for an optical film may have a refractive index of about 1.40 to about 1.69. When the polymer for an optical film has a refractive index within the foregoing range, an optical film made of the polymer for an optical film may have an effective phase-difference value. In an embodiment, the polymer for an optical film may have a refractive index of about 1.45 to about 1.65, and more specifically about 1.48 to about 1.62.

The polymer for an optical film may have glass transition temperature ("$T_g$") of about 80° C. to about 200° C. When the polymer for an optical film has a glass transition temperature within the foregoing range, an optical film made of the polymer for an optical film may have excellent or improved heat resistance. In addition, the polymer for an optical film may have a similar glass transition temperature ("$T_g$") to that of a widely used positive birefringence resin, and thus may be easily laminated or coextruded with the widely used positive birefringence resin and have a wider process condition range in the elongation process and the like. In an embodiment, the polymer for an optical film may have a glass transition temperature ("$T_g$") of about 100° C. to about 150° C., and more specifically about 105° C. to about 140° C.

Accordingly, the polymer for an optical film may be used to fabricate various optical films for a variety of applications including those where a wide viewing angle is desired.

Hereinafter, a method of preparing the polymer for an optical film is described.

In an embodiment, a method of preparing a polymer for an optical film includes combining (e.g., mixing) a monomer represented by the following Chemical Formula 1-1, a monomer including an unsaturated bond copolymerizable with the monomer represented by Chemical Formula 1-1, and a free radical initiator, to form a mixture; and polymerizing the mixture to provide the polymer for an optical film. The combining may be performed in any order, for example, the monomers may first be combined and the free radical initiator may be added thereto, or the free radical initiator may be combined with any one or more of the monomers prior to addition of the remaining monomers.

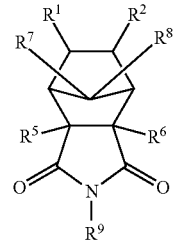

Chemical Formula 1-1

In Chemical Formula 1-1, $R^1$ to $R^9$ are the same as defined in Chemical Formula 1.

The monomer including an unsaturated bond copolymerizable with the monomer represented by the Chemical Formula 1-1 may include tetrasubstituted, trisubstituted, disubstituted, or monosubstituted C=C bond, for example a vinyl or an allyl bond, and may further include a substituted or unsubstituted C6-C30 aromatic group or a substituted or unsubstituted C2-C30 ester group. In an embodiment the monomer copolymerizable with the monomer represented by the Chemical Formula 1-1 may be a monomer represented by the following Chemical Formula 2-1, a monomer represented by the following Chemical Formula 3-1, or a combination thereof, but is not limited thereto.

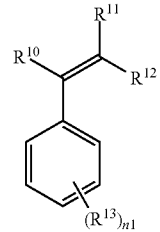

Chemical Formula 2-1

In Chemical Formula 2-1, $R^{10}$ to $R^{13}$, and n1 are the same as defined in the above Chemical Formula 2.

Chemical Formula 3-1

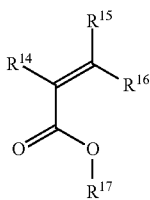

In Chemical Formula 3-1,
$R^{14}$, $R^{15}$, $R^{16}$, and $R^{17}$ are the same as defined in the above Chemical Formula 3.

In an embodiment, the monomer represented by Chemical Formula 1-1 may include a monomer represented by the following Chemical Formulas 31-1 to 31-3, or a combination thereof, but is not limited thereto.

Chemical Formula 31-1

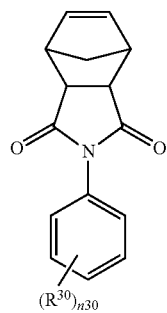

Chemical Formula 31-2

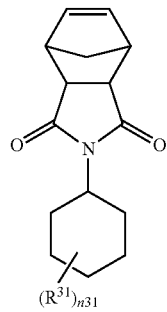

Chemical Formula 31-3

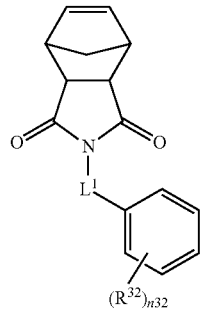

In Chemical Formulas 31-1 to 31-3,
$R^{30}$ to $R^{32}$, $L^1$, and n30 to n32 are the same as defined in the above Chemical Formulas 11-1 to 11-3.

In an embodiment, the monomer represented by Chemical Formula 1-1 may include a monomer represented by the following Chemical Formulas 41-1 to 41-3, or a combination thereof, the monomer represented by Chemical Formula 2-1 may include a monomer represented by the following Chemical Formula 42-1, and the monomer represented by Chemical Formula 3-1 may include a monomer represented by Chemical Formula 43-1, a monomer represented by the following Chemical Formula 43-2, or a combination thereof, but they are not limited thereto.

Chemical Formula 41-1

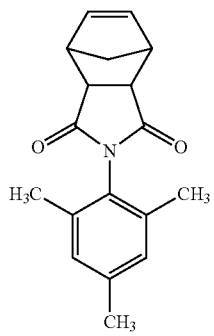

Chemical Formula 41-2

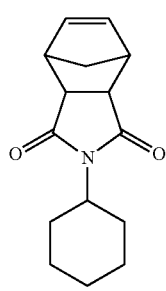

Chemical Formula 41-3

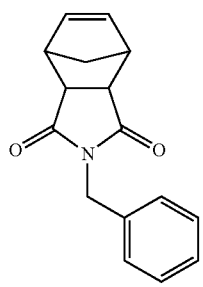

Chemical Formula 42-1

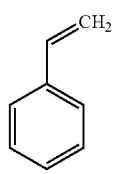

Chemical Fomula 43-1

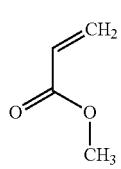

Chemical Fomula 43-2

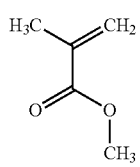

As stated above, other types of monomers may be used instead of or in addition to the repeating unit represented by Chemical Formula 2-1, Chemical Formula 3-1, and a combination thereof, provided that the other monomers comprise an unsaturated bond copolymerizable with the repeating unit A, and the desired properties of the polymer for an optical film are not significantly adversely affected, for example heat resistance, moisture resistance, and negative birefringence, and provided that the polymer can be processed to form an optical film and is suitable for use in an intended device, for example a display device. Other types of monomers comprising an unsaturated bond copolymerizable with the repeating unit A include a substituted or unsubstituted vinyl ester monomer, a substituted or unsubstituted vinyl ether monomer, a substituted or unsubstituted allyl ether monomer, a substituted or unsubstituted allyl ester monomer, a substituted or unsubstituted (meth)acrylate ester monomer, a substituted or unsubstituted maleimide monomer, a substituted or unsubstituted itaconimide monomer, and the like. Such monomers may include other polymer repeating units, (e.g., amide units, carbonate units, ester units, ether units, imide units, siloxane units, silane units, and the like, as well as combinations thereof), for example a urethane di(meth)acrylate. In an embodiment, monomers other than the monomers represented by Chemical Formula 1-1, and the monomers represented by Chemical Formula 2-1, Chemical Formula 3-1, and a combination thereof is used to manufacture the polymer for an optical film.

According to an embodiment the monomer represented by Chemical Formula 1-1, together with the monomer represented by Chemical Formula 2-1, the monomer represented by Chemical Formula 3-1, or a combination thereof may be combined in a solvent. According to another embodiment, the monomers may be easily combined without a solvent, when one or more of the monomers represented by Chemical Formulas 2-1, 3-1, or a combination thereof, dissolves the monomer represented by Chemical Formula 1-1.

When a solvent is used, the solvent may dissolve the monomers and generate heat, and thus may effectively facilitate polymerization of the monomers. The solvent may be a benzene-containing solvent such as benzene, ethyl benzene, toluene, xylene, cresol, or the like; an aliphatic-containing solvent such as pentane, cyclopentane, hexane, cyclohexane, heptane, or the like; a halogen-containing solvent such as methylene chloride, chloroform, or the like; tetrahydrofuran; ethylacetate; dimethyl formamide; dimethyl acetamide; diethyl ether, petroleum ether, dimethylsulfoxide, acetonitrile, methanol, ethanol, or the like. Each of the foregoing solvents may be used singularly or as a combination, but is not limited thereto.

When the solvent is used, the solvent may be used in an amount of about 10 parts by weight to about 50 parts by weight based on 100 parts by weight of the monomer, specifically about 15 parts by weight to about 45 parts by weight based on 100 parts by weight of the monomer, more specifically about 20 parts by weight to about 40 parts by weight based on 100 parts by weight of the monomer, but may be adjusted to obtain a desired molecular weight and dispersibility and is not limited to the foregoing ranges.

When the monomer represented by Chemical Formula 1-1 is combined with the monomer represented by Chemical Formulas 2-1, 3-1 or a combination thereof, and a free radical initiator to form a mixture, the resultant mixture may be easily polymerized by the free radical initiator, for example a peroxide-based initiator, to form the polymer for an optical film without the use of a metal catalyst. Polymers formed under these conditions have excellent or improved processibility and economic feasibility.

According to another embodiment, a metal catalyst instead of the free radical initiator may be used as an initiator, but it may make it difficult to control a manufacturing process, and make the process complex, deteriorating processibility and economic feasibility. In addition, it is possible the metal catalyst may not be completely refined, i.e., purified, and some of the impurities or metal catalyst residue may remain, which may scatter light and be seen as a color stain.

According to an embodiment, the free radical initiator may be a peroxide-containing initiator, an azo-containing initiator, or a combination thereof.

The peroxide-containing initiator may include a substituted or unsubstituted arylperoxide, a substituted or unsubstituted alkylperoxide, a substituted or unsubstituted hydroperoxide, a substituted or unsubstituted peroxy ester, a substituted or unsubstituted peroxy carbonate, or a combination thereof. According to an embodiment, the peroxide-containing initiator may include benzoyl peroxide, t-butylperoxy-2-ethyl hexanoate, dicumyl peroxide, t-butyl peroxide, 1,1-di(t-butylperoxy)cyclohexane, dibenzoyl peroxide, 2-butanone peroxide, t-butyl perbenzoate, 2,5-bis(t-butylperoxy)-2,5-dimethylhexane, bis(t-butylperoxyisopropyl)benzene, t-butyl hydroperoxide, or a combination thereof, but is not limited thereto.

The azo-containing initiator may include 2,2'-azobisisobutyronitrile ("AIBN"), 1,1'-azobis(cyclohexanecarbonitrile), 4,4-azobis(4-cyanovaleric acid), 2,2'-azobis(4-methoxy-2,4-dimethylvaleronitrile), 4,4'-azobis(4-cyanovaleric)acid, 2,2'-azobis[2-methyl-N-(I,I-bis(hydroxymethyl)-2-hydroxyethyl) propionamide], 2'-azobis[2-methyl-N-(2-hydroxyethyl)propionamide], or a combination thereof. The free radical initiator, for example the peroxide-based initiator may be used in an amount of about 0.001 parts by weight to about 10 parts by weight based on 100 parts by weight of the total weight of all monomers.

According to an embodiment, the polymerization may be performed at a temperature effective to initiate polymerization (i.e., effective to thermally decompose the free radical initiator), for example as a temperature ranging from about 60° C. to about 200° C., specifically about 70° C. to about 150° C., and more specifically about 80° C. to about 150° C. According to an embodiment, the polymerization may be performed with a reaction time ranging from about 1 hour to about 48 hours, specifically about 10 hours to about 24 hours, and more specifically about 12 hours to about 20 hours. When the polymerization is performed within the foregoing process condition ranges, the polymer may have a desired number average molecular weight, weight average molecular weight, dispersibility, and a stable polymerization yield may be achieved, for example, a polymerization yield of greater than or equal to about 60%, specifically greater than or equal to about 65%, more specifically greater than or equal to about 70%.

The monomer represented by Chemical Formula 1-1 and the monomer represented by Chemical Formulas 2-1 3-1, or a combination thereof, may be mixed in a mole ratio of about 0.1:99.9 to about 50:50. While not wishing to be bound by theory, it is believed when each monomer is mixed within the foregoing range, the monomers may be effectively polymerized by the free radical initiator, for example the peroxide-containing initiator, and negative birefringence, heat resistance, and moisture resistance of the resulting polymer for an optical film may be effectively improved. In an embodiment, the monomer represented by Chemical Formula 1-1 and the monomer represented by Chemical Formula 2-1, the monomer represented by Chemical Formula 3-1, or a combination thereof may be mixed in a mole ratio of about 5:95 to about 20:80, more specifically about 10:90 to about 30:70. When an additional monomer other than the monomers represented by Chemical Formula 1-1 and the monomers represented by Chemical Formulas 2-1 3-1, or a combination thereof, is present during polymerization, such monomers are present in an amount ranging from about 0.1 to about 10 mole percent, or about 0.1 to about 5 mole percent, based on the total moles of monomers used to manufacture the polymer for an optical film.

According to another embodiment, an optical film including the polymer for an optical film is provided.

The optical film includes the polymer for an optical film, and thus has excellent or improved negative birefringence, heat resistance, and moisture resistance.

The optical film has an in-plane phase-difference value ("$R_e$") ranging from about 0 nanometers (nm) to about 500 nm at a wavelength of about 550 nm. When the optical film has an in-plane phase-difference value ($R_e$) within the range, it may be effectively used for various applications, including optical devices. In an embodiment, the optical film may have an in-plane phase-difference value ($R_e$) ranging from about 50 nm to about 200 nm at a wavelength of about 550 nm, more specifically from about 75 nm to about 175 nm at a wavelength of about 550 nm.

The optical film has a thickness direction phase-difference value ("$R_{th}$") ranging from about 0 nm to about −1000 nm at a wavelength of about 550 nm. When the optical film has a thickness direction phase-difference value ($R_{th}$) within the range, it may be effectively used for various applications, including optical devices. In an embodiment, the optical film may have a thickness direction phase-difference value ($R_{th}$) ranging from about 0 nm to about −500 nm at a wavelength of about 550 nm, more specifically from about 0 nm to about −300 nm at a wavelength of about 550 nm.

The optical film may have a short wavelength dispersion of the in-plane phase-difference value ($R_e$)(450 nm/550 nm) ranging from about 0.81 to about 1.20, and specifically about 0.81 to about 1.16, more specifically about 0.81 to about 1.10. According to an embodiment, the optical film may have a long wavelength dispersion of the in-plane phase-difference value ($R_e$)(650 nm/550 nm) ranging from about 0.90 to about 1.18, specifically about 0.95 to about 1.18, more specifically about 0.96 to about 1.18.

Herein, the short wavelength dispersion of an in-plane phase-difference value ($R_e$) (450 nm/550 nm) is obtained by dividing an in-plane phase-difference value ($R_e$) at a wavelength of about 450 nm by an in-plane phase-difference value ($R_e$) at a wavelength of about 550 nm. The long wavelength dispersion of an in-plane phase-difference value ($R_e$) (650 nm/550 nm) is obtained by dividing an in-plane phase-difference value ($R_e$) at a wavelength of about 650 nm by an in-plane phase-difference value ($R_e$) at a wavelength of about 550 nm.

When the optical film has short wavelength dispersion and long wavelength dispersion within the foregoing range, it may have effective negative birefringence, and then may be mixed with positive birefringence, thus exhibiting effective reverse wavelength dispersion.

The optical film may have a total light transmittance of greater than or equal to about 80% at a wavelength ranging from about 380 nm to about 780 nm. When the optical film has light transmittance within the foregoing range, the optical film may not deteriorate luminescence characteristics and color reproducibility. In an embodiment, the optical film may have a total light transmittance of greater than or equal to about 90% in a wavelength ranging from about 380 nm to about 780 nm, more specifically greater than or equal to about 93% in a wavelength ranging from about 380 nm to about 780 nm.

The optical film may have a haze of less than or equal to about 3%. When the optical film has a haze within the foregoing range, the optical film may be effectively transparent and may have excellent or improved clarity. In an embodiment, the optical film may have a haze of less than or equal to about 1.5%, and more specifically, less than or equal to about 1%.

The optical film may have a yellow index ("YI") of less than or equal to about 3.0. While not wishing to be bound by theory, it is believed when the optical film has a yellow index ("YI") within the foregoing range, it may be transparent and colorless. In an embodiment, the optical film may have a yellow index ("YI") ranging from about 0.5 to about 3.0, more specifically about 1.0 to about 3.0.

The optical film may have a thickness ranging from about 0.01 micrometers (μm) to about 1000 μm, specifically about 1 μm to about 500 μm, more specifically about 10 μm to about 100 μm, but is not limited thereto, and the thickness may be adjusted depending on the application of the optical film.

The optical film may have a glass transition temperature ("$T_g$") of about 80° C. to about 200° C. When the optical film has a glass transition temperature within the foregoing range, it may have excellent or improved heat resistance and a wider process condition range in the elongation process and the like. In an embodiment, the optical film may have a glass transition temperature ($T_g$) of about 100° C. to about 150° C., and more specifically about 105° C. to about 145° C.

The optical film may be fabricated by melting the polymer for an optical film or dissolving it in an organic solvent (for example a solvent as described above for polymerization, such as toluene, methyl isobutyl ketone, cyclopentanone, methylene chloride, 1,2-dichloroethane, methyl amyl ketone, methyl ethyl ketone, methyl isoamyl ketone, or combinations thereof), spin-coating, spray coating, roll coating, curtain coating, dip coating, or placing the melted polymer or the polymer solution in a mold and compressing the polymer in the mold to form a polymer sheet, and elongating the polymer sheet to provide the optical film. A cast polymer or polymer solution may also be compressed using a nip roller, for example. According to an embodiment, the elongating of the sheet may be performed in a direction of one axis or performed sequentially or simultaneously in a direction of two axes. A main chain of the polymer is aligned in an elongation axis direction by the elongating process, and the repeating unit A including the repeating unit represented by Chemical Formula 1 and the repeating unit B including a repeating unit represented by the Chemical Formulas 2 and 3 or a combination thereof, in a perpendicular direction to the alignment axis of the main chain of the polymer, such that the elongated sheet, i.e., the optical film may effectively show negative birefringence.

The sheet may be fabricated by compressing the melted polymer or the polymer solution with a high pressure at a temperature ranging from about 200° C. to about 300° C., specifically about 210° C. to about 290° C., more specifically at about 225° C. to about 275° C. According to another embodiment, the sheet may be fabricated by discharging the melted polymer or the polymer solution in a chill roll through a T-die, but is not limited thereto.

The sheet may be elongated at a temperature ranging from about 100° C. to about 150° C., specifically about 105° C. to about 145° C., and more specifically about 110° C. to about 135° C.

According to an embodiment, the sheet may be elongated at an elongation rate ranging from about 10% to about 300%, specifically about 20% to about 200%, and more specifically, about 20% to about 100%. According to an embodiment, the elongation rate may be calculated according to the following Equation 1.

$$\text{Elongation rate}(\%) = (L-L_0/L_0) \times 100 \quad \text{Equation 1}$$

In Equation 1,
$L_0$ refers to a length of a sheet before the elongation, and
L refers to a length of a sheet after the elongation.

The optical film may be formed into a single layer or multilayer by using the polymer for an optical film as a negative birefringence polymer. According to an embodiment, a film including a positive birefringence polymer that is generally used in a related field, for example, a polyethylene terepthalate, polyethylene naphthalate, cyclic olefin polymer ("COP"), may be laminated on a surface of the optical film to provide an optical film product. Accordingly, the resulting optical film product may have reverse wavelength dispersibility and thus may form a compensation film capable of complementing wide viewing angle. The optical film may have reverse wavelength dispersibility, and thus may prevent color shift, and increase a contrast ratio.

However, the optical film is not limited thereto but may be formed into a single layer or multilayer by combining (e.g., blending or copolymerizing) the negative birefringence polymer and a positive birefringence polymer known for use in a related field, e.g., optical films, such as polyethylene terepthalate and polyethylene naphthalate, and then forming a film from the combination. According to an embodiment, the optical film thus formed may be as a compensation film.

According to another embodiment a display device including the optical film is provided. In an embodiment, the display device may be a liquid crystal display ("LCD"), an organic light emitting diode ("OLED") device, and the like, but is not limited thereto.

According to an embodiment, a liquid crystal display ("LCD") including the optical film is described referring to FIG. 1.

FIG. 1 is a cross-sectional view showing an LCD according to an embodiment.

Referring to FIG. 1, the LCD according to an embodiment includes a liquid crystal display panel 10 and an optical film 20 disposed on both a lower part, e.g. a first display panel 100, opposite a liquid crystal layer 300, and an upper part, e.g. a second display panel 200, opposite the liquid crystal layer 300, of the liquid crystal display panel 10.

The liquid crystal display panel 10 may be a twisted nematic ("TN") mode panel, a patterned vertical alignment ("PVA") mode panel, or the like, but is not limited thereto.

The liquid crystal display panel 10 includes a first display panel 100, a second display panel 200, and a liquid crystal layer 300 interposed between the first display panel 100 and the second display panel 200.

The first display panel 100 may include, for example, a thin film transistor ("TFT", not shown) and a first field generating electrode (not shown) connected to the TFT, sequentially disposed on a substrate (not shown). The second display panel 200 may include, for example, a color filter (not shown) and a second field generating electrode, (not shown) sequentially disposed on the substrate.

The liquid crystal layer 300 may include a plurality of liquid crystal molecules. The liquid crystal molecules may have positive or negative dielectric anisotropy. When the liquid crystal molecules have positive dielectric anisotropy, the long axis of the liquid crystal molecules may be aligned substantially parallel to the surface of the first display panel 100 and the second display panel 200 when not applying an electric field, and may be aligned substantially perpendicular to the surface of the first display panel 100 and the second display panel 200 when applying an electric field.

According to another embodiment, when the liquid crystal molecules have negative anisotropy, the long axis of the liquid crystal molecules may be aligned substantially perpendicular to the surface of the first display panel 100 and the second display panel 200 when not applying an electric field, and may be aligned substantially parallel to the surface of the first display panel 100 and the second display panel 200 when applying an electric field.

The optical films 20 are disposed on an outside surface of the liquid crystal display panel 10. Referring to FIG. 1, although the optical films 20 are shown to be disposed on both the upper part, e.g. the second display panel 200, opposite the liquid crystal layer 300, and lower part, e.g. the first display panel 100, opposite the liquid crystal layer 300, of the liquid crystal display panel 10, in an alternative embodiment (not shown) the optical film 20 may be disposed on either the upper part, or the lower part, of liquid crystal display panel 10.

As described above, the optical film 20 may be an elongated film including the polymer for an optical film including a repeating unit A including a repeating unit represented by Chemical Formula 1; and a repeating unit B derived from a monomer including an unsaturated bond copolymerizable with the repeating unit A, and may act as a compensation film.

Hereinafter, the embodiments are illustrated in more detail with reference to examples. However, the following are exemplary embodiments of the disclosure, and the disclosure is not limited thereto.

Preparation of Monomer

Synthesis Example 1

Exo-norbornene-2,3-dicarboxylic anhydride (exo-NDA) is prepared by thermal isomerization of commercially available endo-NDA (from Aldrich). The exo-NDA is dissolved in glacial acetic acid (20% w/v) in a three-necked flask under a nitrogen atmosphere. After raising the temperature to 120° C., a small excess of the 2,4,6-trimethylaniline is added in small portions, and the mixture is refluxed for 6 hours. The resulting mixture is cooled and added to an ice-water mixture and then extracted with $CH_2Cl_2$. The $CH_2Cl_2$ extract was washed with distilled water and dried over anhydrous magnesium sulfate. $CH_2Cl_2$ is removed from the filtrate using a rotary evaporator, and the crude product is recrystallized from methanol. Liquid products were purified by distillation under vacuum to obtain a compound represented by the Chemical Formula 41-1.

Chemical Formula 41-1

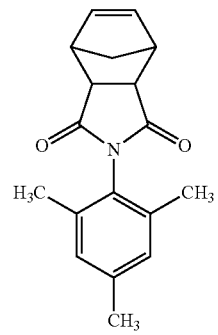

Synthesis Example 2

A compound represented by the Chemical Formula 41-3 is prepared according to the same method as Example 1, except for using 35.54 mmol of benzylamine instead of 2,4,6-trimethylaniline.

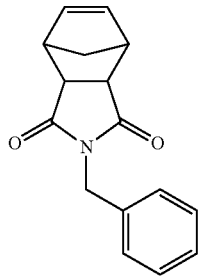

Chemical Formula 41-3

Synthesis Example 3

A compound represented by the Chemical Formula 41-2 is prepared according to the same method as Example 1, except for using 35.54 mmol of cyclohexylamine instead of 2,4,6-trimethylaniline.

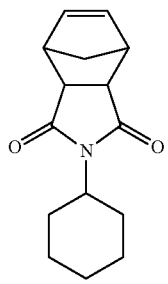

Chemical Formula 41-2

Preparation of Polymer for Optical Film

Example 1

10 grams (g) (35.54 millimoles (mmol)) of the compound prepared according to Synthesis Example 1, is mixed with 33.31 g (319.86 mmol) of styrene and 13 g of toluene.

Then, 0.054 g of Perhexa C-40 (NOF Co., Japan) is added to the mixture. The resulting mixture is agitated under a nitrogen ($N_2$) atmosphere at about 110° C. for about 24 hours, preparing a white solid polymer for an optical film. The yield is about 77%.

The polymer for an optical film has a number average molecular weight of about 56,000 g/mol, a weight average molecular weight of about 114,000 g/mol, and a polydispersity index of about 2.03. In addition, the polymer for an optical film has a refractive index of about 1.583.

Example 2

A polymer for an optical film is prepared according to the same method as Example 1, except for using 35.54 mmol of the compound prepared according to Synthesis Example 2 instead of the compound prepared according to Synthesis Example 1. The yield is about 70%.

The polymer for an optical film has a number average molecular weight of about 51,000 g/mol, a weight average molecular weight of about 107,000 g/mol, and a polydispersity index of about 2.10. In addition, the polymer for an optical film has a refractive index of about 1.581.

Example 3

A polymer for an optical film is fabricated according to the same method as Example 1, except for using 35.54 mmol of the compound prepared according to Synthesis Example 3 instead of the compound prepared according to Synthesis Example 1. The yield is about 75%.

The polymer for an optical film has a number average molecular weight of about 71,000 g/mol, a weight average molecular weight of about 161,000 g/mol, and a polydispersity index of about 2.26. In addition, the polymer for an optical film has a refractive index of about 1.583.

Comparative Example 1

A polymer for an optical film is fabricated according to the same method as Example 1, except for using 35.54 mmol of a compound represented by the following Chemical Formula 10 (TCI, Japan) instead of the compound prepared according to Synthesis Example 1. The yield is about 80%.

The polymer for an optical film has a number average molecular weight of about 65,000 g/mol, a weight average molecular weight of about 158,000 g/mol, and a polydispersity index of about 2.43. In addition, the polymer for an optical film has a refractive index of about 1.580.

Chemical Formula 10

Preparation of Optical Film

Example 4

The polymer for an optical film according to Example 1 is melted at about 250° C., and then put in a mold, and compressed to form a sheet.

Then, the sheet is elongated about 80% at about 150° C. and cooled to room temperature, fabricating the optical film.

Example 5

An optical film is fabricated according to the same method as in Example 4, except for using the polymer for an optical film according to Example 2 instead of the polymer for an optical film according to Example 1.

Example 6

An optical film is fabricated according to the same method as Example 4, except for using the polymer for an optical film according to Example 3 instead of the polymer for an optical film according to Example 1.

Comparative Example 2

An optical film is fabricated according to the same method as Example 4, except for using the polymer for an optical film according to Comparative Example 1 instead of the polymer for an optical film according to Example 1.

Experimental Example 1

Glass Transition Temperature

About 10 mg of each polymer for an optical film according to Examples 1 to 3 and Comparative Example 1 is respectively put on the holder of a differential scanning calorimeter ("DSC") equipment (METTLER TOLEDO Inc., Switzerland), scanned primarily at a speed of about 10° C. per minute (° C./min) at a temperature ranging from about 30° C. to about 150° C., and scanned secondarily at a temperature ranging from about 30° C. to about 300° C., and measured regarding glass transition temperature. The results are shown in the following Table 1.

Experimental Example 2

Wavelength Dispersion

The optical films according to Examples 4 to 6 and Comparative Example 2 are each cut into a 1 centimeter (cm)×1 cm specimen and the specimen put on an Axoscan (Axometrics Inc., USA), and then measured regarding a short wavelength dispersion ("SWD") and a long wavelength dispersion ("LWD") of the specimen at a wavelength ranging from about 400 nm to about 700 nm. Herein, the reference wavelength is about 550 nm. The results are provided in the following Table 1.

TABLE 1

| No. | Glass transition temperature (° C.) | No. | Wavelength dispersion | |
| --- | --- | --- | --- | --- |
| | | | SWD* (450 nm/ 550 nm) | LWD** (650 nm/ 550 nm) |
| Example 1 | 110 | Example 4 | 1.06 | 0.97 |
| Example 2 | 120 | Example 5 | 1.058 | 0.97 |
| Example 3 | 135 | Example 6 | 1.056 | 0.97 |
| Comparative Example 1 | 132 | Comparative Example 2 | 1.06 | 0.96 |

*SWD: short wavelength dispersion of the in-plane phase-difference value ("$R_e$")
**LWD: long wavelength dispersion of the in-plane phase-difference value ("$R_e$")

Referring to Table 1, the polymers for an optical film according to Examples 1 to 3 have a glass transition temperature ranging from about 100° C. to about 140° C., which is similar to the glass transition temperature of a generally-used positive birefringence polymer, resulting in little if any difference between the glass transition temperature of the polymer for an optical film and the positive birefringence polymer. Thus the resulting polymer for an optical film may solve a problem that arises when a glass transition temperature ($T_g$) difference exists between the polymer for an optical film and the positive birefringence polymer.

According to another embodiment, a polymer for an optical film prepared by respectively using a compound represented by the above Chemical Formulas 41-1, 41-2, and 41-3 in a greater mole ratio relative to styrene, in Examples 1 to 3, may have higher heat resistance.

In addition, the optical films according to Examples 4 to 6 have a short wavelength dispersion of the in-plane phase-difference value ($R_e$) (450 nm/550 nm) ranging from about 0.81 to about 1.16 and a long wavelength dispersion of the in-plane phase-difference value ($R_e$) (650 nm/550 nm) ranging from about 0.95 to about 1.18, resulting in a variety of negative birefringence and wavelength dispersion slopes.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A phase-difference compensation film,
wherein the phase-difference compensation film is an elongated film comprising a polymer for an optical film,
wherein the polymer for an optical film comprises:
a repeating unit A comprising one of repeating units represented by the following Chemical Formulas 21-1 to 21-3; and a combination thereof; and
a repeating unit B derived from a monomer comprising an unsaturated bond copolymerizable with the repeating unit A:

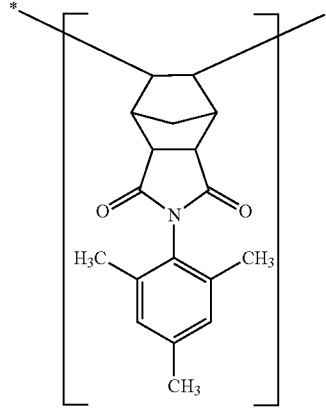

Chemical Formula 21-1

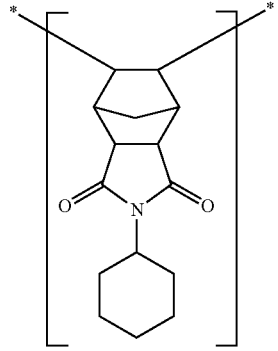

Chemical Formula 21-2

-continued

Chemical Formula 21-3

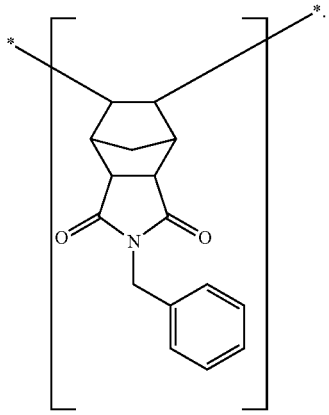

2. The phase-difference compensation film of claim 1, wherein the repeating unit B comprises one of a repeating unit represented by the following Chemical Formula 2, a repeating unit represented by the following Chemical Formula 3; and a combination thereof:

Chemical Formula 2

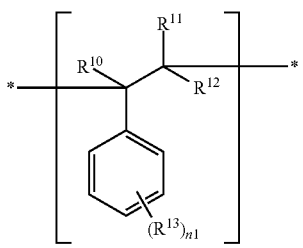

wherein, in Chemical Formula 2,
$R^{10}$ to $R^{12}$ are the same or different in each repeating unit and are each independently hydrogen, or a substituted or unsubstituted C1 to C10 aliphatic group,
$R^{13}$ is the same or different in each repeating unit and each is independently hydrogen, a halogen, a substituted or unsubstituted C1 to C30 aliphatic group, a substituted or unsubstituted C3 to C30 alicyclic group, a substituted or unsubstituted C6 to C30 aromatic group, a substituted or unsubstituted C2 to C30 heterocyclic group, a substituted or unsubstituted C1 to C30 alkoxy group, a substituted or unsubstituted C6 to C30 aryloxy group, a substituted or unsubstituted C2 to C30 ester group, a carboxyl group, or —N($R^{100}$)($R^{101}$), (wherein $R^{100}$ and $R^{101}$ are the same or different and are each independently hydrogen, or a substituted or unsubstituted C1 to C10 aliphatic group), wherein the aromatic group is present singularly; at least two aromatic groups are linked to provide a condensed cyclic group; or at least two aromatic groups are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, and n1 is the same or different in each repeating unit and each is independently an integer ranging from 0 to 5, Chemical Formula 3

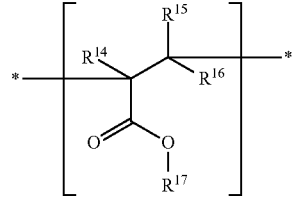

wherein, in Chemical Formula 3,
$R^{14}$ is the same or different in each repeating unit and each is independently hydrogen, or a methyl group,
$R^{15}$ and $R^{16}$ are the same or different in each repeating unit and are each independently hydrogen, or a substituted or unsubstituted C1 to C10 aliphatic group, and
$R^{17}$ is the same or different in each repeating unit and each is independently a substituted or unsubstituted C1 to C30 aliphatic group, a substituted or unsubstituted C3 to C30 alicyclic group, a substituted or unsubstituted C6 to C30 aromatic group, or a substituted or unsubstituted C2 to C30 heterocyclic group, wherein the aromatic group is present singularly; at least two aromatic groups are linked to provide a condensed cyclic group; or at least two aromatic groups are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

3. The phase-difference compensation film of claim 1, wherein the repeating unit B comprises one of repeating units represented by the following Chemical Formulas 22-1, 23-1 and 23-2; and a combination thereof:

Chemical Formula 22-1

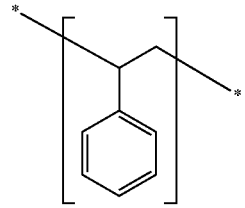

Chemical Formula 23-1

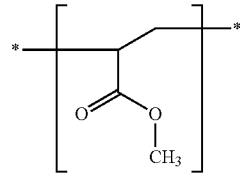

Chemical Formula 23-2

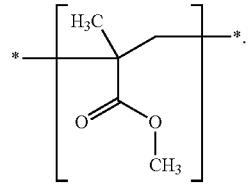

4. The phase-difference compensation film of claim 1, wherein the polymer for an optical film comprises the repeating unit A and the repeating unit B in a mole ratio of about 0.1:99.9 to about 50:50.

5. The phase-difference compensation film of claim 1, wherein the polymer for an optical film has a number average molecular weight (Mn) of about 10,000 grams per mole to about 200,000 grams per mole.

6. The phase-difference compensation film of claim 1, wherein the polymer for an optical film has a polydispersity index of about 1.0 to about 5.0.

7. The phase-difference compensation film of claim 1, wherein the polymer for an optical film has a refractive index of about 1.40 to about 1.69.

8. The phase-difference compensation film of claim 1, wherein the polymer for an optical film has a glass transition temperature ($T_g$) of about 80° C. to about 200° C.

9. The phase-difference compensation film of claim 1, wherein the phase-difference compensation film has an in-plane phase-difference value ($R_e$) ranging from about 0 nanometers to about 500 nanometers at a wavelength of about 550 nanometers.

10. The phase-difference compensation film of claim 1, wherein the phase-difference compensation film has a thickness direction phase-difference value ($R_{th}$) ranging from about 0 nanometers to about −1000 nanometers at a wavelength of about 550 nanometers.

11. The phase-difference compensation film of claim 1, wherein the phase-difference compensation film has a total light transmittance of greater than or equal to about 80% at a wavelength range of about 380 nanometers to about 780 nanometers.

12. The phase-difference compensation film of claim 1, wherein the phase-difference compensation film has a haze of less than or equal to about 3%.

13. The phase-difference compensation film of claim 1, wherein the phase-difference compensation film has a glass transition temperature of about 80° C. to about 200° C.

14. A display device comprising the phase-difference compensation film according to claim 1.

15. The phase-difference compensation film of claim 1, wherein the phase-difference compensation film has a short wavelength dispersion of the in-plane phase-difference value (Re) (450 nanometers/550 nanometers) ranging from about 0.81 to about 1.20 and a long wavelength dispersion of an in-plane phase-difference value (Re) (650 nanometers/550 nanometers) ranging from about 0.90 to about 1.18.

* * * * *